United States Patent [19]

Tanabe et al.

[11] Patent Number: 5,490,227

[45] Date of Patent: Feb. 6, 1996

[54] LIGHT RECEIVING MODULE FOR SCM TRANSMISSION

[75] Inventors: Manabu Tanabe, Kyoto; Kuniaki Utsumi, Sanda; Hideaki Takechi, Osaka; Hiroyuki Sasai, Ikoma; Yasushi Matsui, Neyagawa; Shigeru Yamane, Katano, all of Japan

[73] Assignee: Matsushita Electric Industrial Co., Inc., Osaka, Japan

[21] Appl. No.: 324,885

[22] Filed: Oct. 18, 1994

[30] Foreign Application Priority Data

Oct. 27, 1993 [JP] Japan .................................. 5-268698

[51] Int. Cl.⁶ ...................................................... G02B 6/26
[52] U.S. Cl. ............................... 385/29; 385/28; 385/43; 385/88
[58] Field of Search ......................... 385/29, 28, 31, 385/39, 41, 42, 43, 48, 88

[56] References Cited

U.S. PATENT DOCUMENTS

| | | | |
|---|---|---|---|
| 4,575,181 | 3/1986 | Ishikawa | 385/88 X |
| 4,877,300 | 10/1989 | Newhouse et al. | 385/43 |
| 5,044,723 | 9/1991 | MacDonald | 385/12 |
| 5,080,506 | 1/1992 | Campbell et al. | 385/29 |
| 5,138,675 | 8/1992 | Schofield | 385/29 |
| 5,163,114 | 1/1992 | Hendow | 385/31 X |

OTHER PUBLICATIONS

Lidgard et al; IEEE Photonics Technology Letters, vol. 2, No. 1, pp. 519–521, 1990, "Generation and Cancellation of Second–Order Harmonic Distortion in Analog Optical Systems by Interferometric FM–AM Conversion." no month.

Angenent et al; IOCC–ECOC '91, WeC8–4, 1991, "Distortion of a Multi–carrier Signal Due to Optical Reflections." no month.

Primary Examiner—John D. Lee
Assistant Examiner—Phan T. H. Palmer
Attorney, Agent, or Firm—Renner, Otto, Boisselle & Sklar

[57] ABSTRACT

A light-receiving module includes: a pigtail optical fiber including a core portion for transmitting an optical signal and a cladding portion covering a side face of the core portion; an optical connector provided at a first end of the pigtail optical fiber for optically connecting a transmitting optical fiber with the end of the pigtail optical fiber; a light-receiving device having a light-receiving face for receiving the optical signal propagating through the core portion and for converting the optical signal into an electric signal; an optical coupling system for converging the optical signal emitted from a second end of the pigtail optical fiber onto the light-receiving face of the light-receiving device; and means for preventing light propagating through the cladding portion from reaching the light-receiving face of the light-receiving device so that the optical signal propagating through the core portion does not interfere with the light propagating through the cladding portion on the light-receiving face of the light-receiving device.

23 Claims, 14 Drawing Sheets

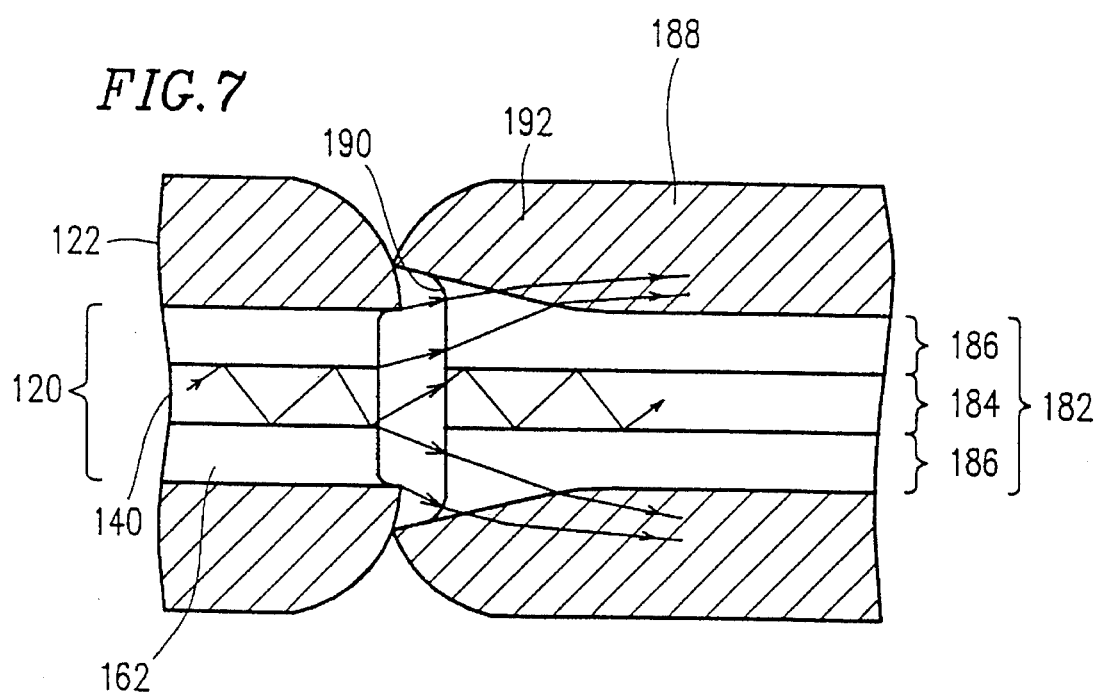

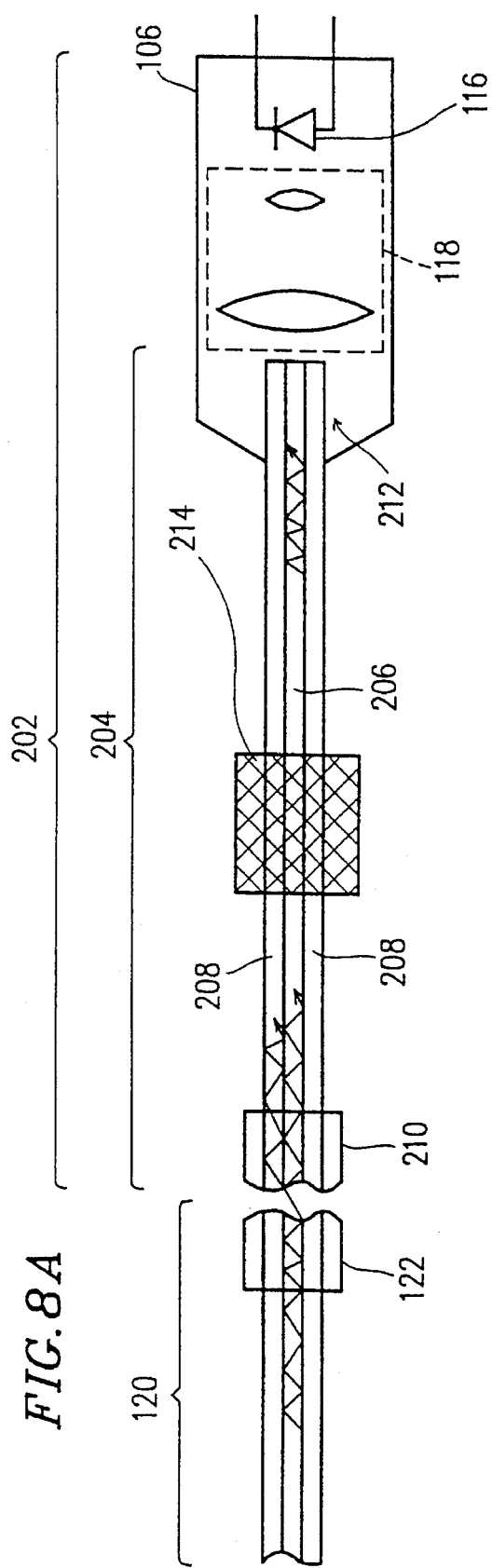
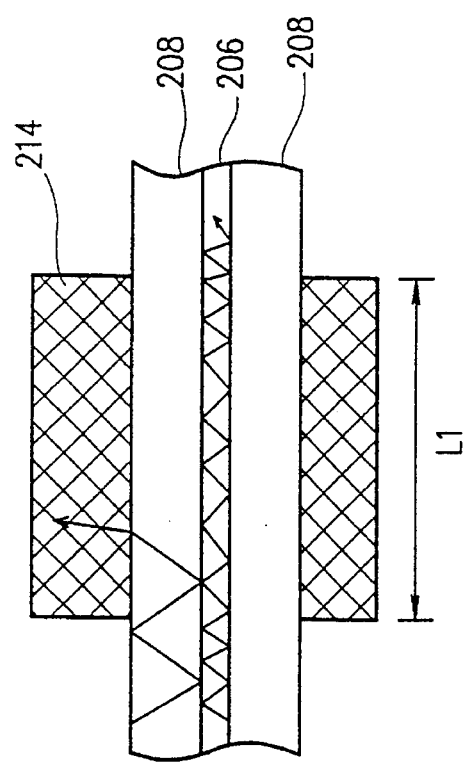
FIG. 8A
FIG. 8B

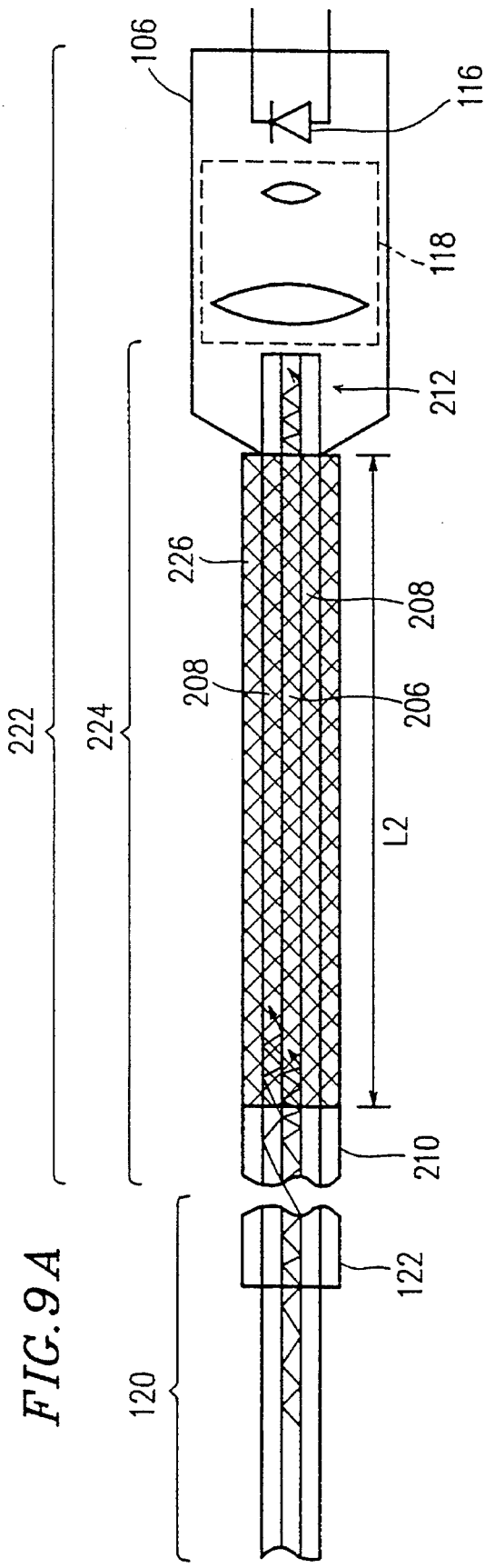

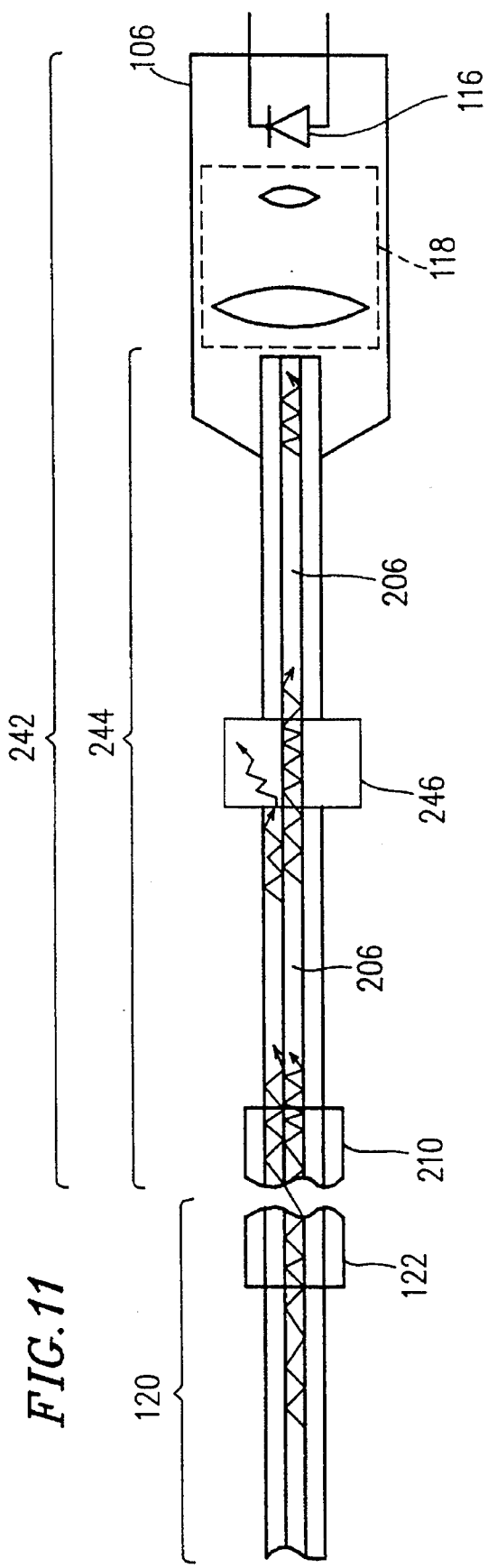

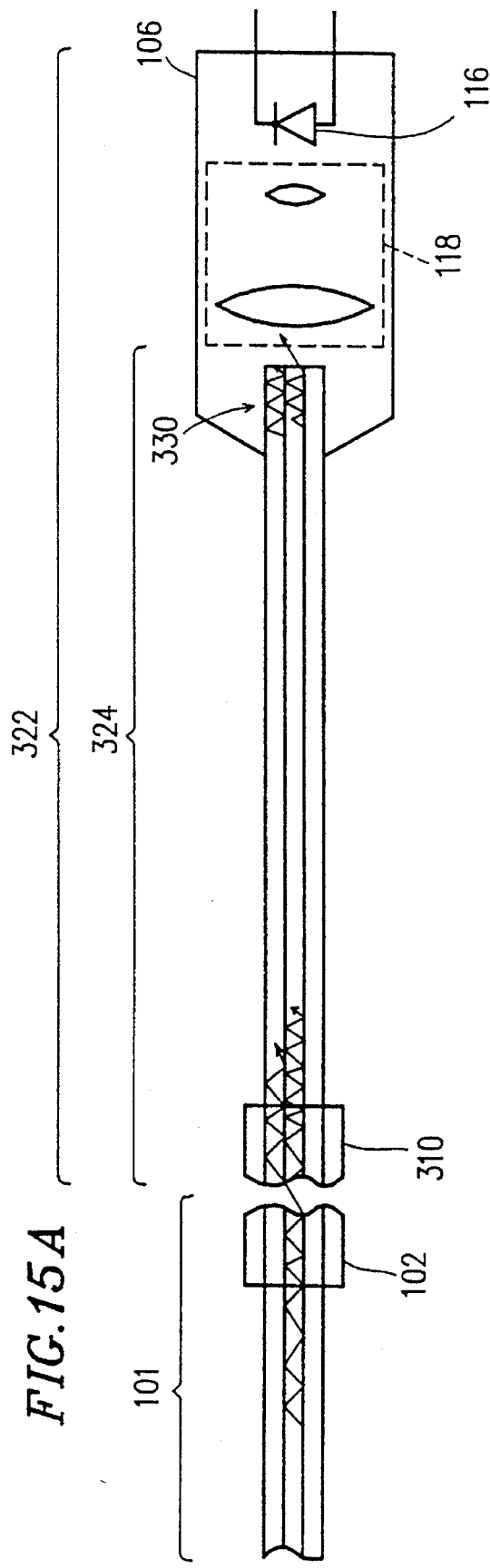
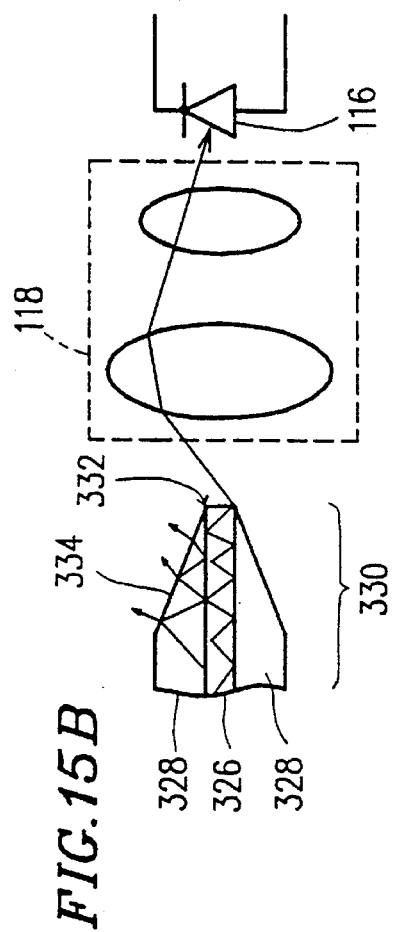
FIG.15A
FIG.15B

LIGHT RECEIVING MODULE FOR SCM TRANSMISSION

BACKGROUND OF THE INVENTION

1. Field of the Invention

The present invention relates to a light-receiving module used in a light-receiving apparatus for light transmission. In particular, the present invention relates to a light-receiving module used in a subcarrier multiplexing transmission system in which distortion and noise should be low.

2. Description of the Related Art

In Subcarrier multiplexing (hereinafter, referred to as SCM) transmission, a carrier wave is modulated by the signal that is to be transmitted and then the intensity of a semiconductor laser beam is directly modulated by the modulated carrier, thereby transmitting light. In such a SCM transmission, multipath represented by multiple reflection is one of the causes of deterioration of transmission characteristics such as noise and distortion.

For example, when an optical signal for SCM transmission is transmitted through a transmission path having a plurality of reflecting points, an optical signal received by a light-receiving apparatus provided at the end of the transmission path includes a direct light which reaches the light-receiving apparatus without being reflected, and a delay light which reaches the light-receiving apparatus by being reflected even number of times at the plurality of reflecting points. This means that the transmission path from a light-transmitting apparatus to a light-receiving device of the light-receiving apparatus has paths traced by the direct light and traced by the reflected light. The plurality of paths are referred to as "multipath". In particular, such a transmission state can often be seen in radio transmission systems.

The delay light travels in a long optical path as compared with the direct light since the delay light is reflected at each reflecting point. Therefore, a time delay occurs in the arrival time of the delay light. Normally, the reflection amount at each reflecting point is not very big. For example, the reflection amount at an open end of the transmission path is about −15 dB, and that in a normal optical connector is in the range of −25 to −30 dB. Therefore, the difference in the level of optical power is caused between the direct light and the reflected light to some degree.

The direct light and the delay light generated by the presence of the multipath are the same signal, except for the arrival time and optical power level. Therefore, the lights interfere (delayed self-homodyne) with each other on a light-receiving face of the light-receiving device and generate beat, whereby beat also appears in an electric signal converted from the two optical signals at the light-receiving device. Particularly, the SCM transmission has such a problem that the beat interferes with the transmission as the noise and the distortion in the frequency region of the electric transmission signal, causing deterioration of the transmission characteristics. As for the deterioration of transmission characteristics due to the multipath reflection, experiments and theoretical analyses have been reported (ex. A. Lidgard and N. A. Olsson, "Generation and Cancellation of Second-Order Harmonic Distortion in Analog Optical Systems by Interferometic FM-AM Conversion", IEEE Photonics Technology Letters, Vol. 2, No. 1, pp. 519–521, 1990; J. H. Angenent, I. P. D. Ubbens, and P. J. de Waard, "DISTORTION OF A MULTICARRIER SIGNAL DUE TO OPTICAL REFLECTIONS" ECOC'91, IOOC' 91, WeC8-4, 1991).

SUMMARY OF THE INVENTION

A light-receiving module according to the present invention includes: a pigtail optical fiber including a core portion for transmitting an optical signal and a cladding portion covering a side face of the core portion; an optical connector provided at a first end of the pigtail optical fiber for optically connecting a transmitting optical fiber with the end of the pigtail optical fiber; a light-receiving device having a light-receiving face for receiving the optical signal propagating through the core portion and for converting the optical signal into an electric signal; an optical coupling system for converging the optical signal emitted from a second end of the pigtail optical fiber onto the light-receiving face of the light-receiving device; and means for preventing light propagating through the cladding portion from reaching the light-receiving face of the light-receiving device so that the optical signal propagating through the core portion does not interfere with the light propagating through the cladding portion on the light-receiving face of the light-receiving device.

In one embodiment of the invention, the means prevents light propagating through a core portion of the transmission optical fiber from entering the cladding portion of the pigtail optical fiber at the end of the pigtail optical fiber.

In another embodiment of the invention, a diameter of the core portion of the pigtail optical fiber is larger than that of the core portion of the transmission optical fiber, and the pigtail optical fiber is a single-mode optical fiber.

In still another embodiment of the invention, the diameter of the core portion of the pigtail optical fiber is larger than that of the core portion of the transmission optical fiber, and the pigtail optical fiber is a graded-index type multimode fiber which is sufficiently short so that an effect of mode dispersion is neglected.

In still another embodiment of the invention, the diameter of the core portion of the pigtail optical fiber is sufficiently large at an end face of the first end optically connected to the transmission optical fiber so that all optical signals from the core portion of the pigtail optical fiber enter the pigtail optical fiber, and is gradually reduced in a longitudinal direction.

In still another embodiment of the invention, the means prevents the light propagating through the core portion of the transmission optical fiber from entering the cladding portion of the pigtail optical fiber and light propagating through the cladding portion of the transmission optical fiber from entering the cladding portion of the pigtail optical fiber.

In still another embodiment of the invention, a light shielding material covers the cladding portion at an end face of the first end of the pigtail optical fiber.

In still another embodiment of the invention, the cladding portion of the pigtail optical fiber has a tapered shape being thinned to a diameter of the core at an end face of the first end of the pigtail optical fiber so as to prevent the light from entering the cladding portion of the pigtail optical fiber from the transmission optical fiber.

In still another embodiment of the invention, the diameter of the cladding portion is large at an end face of the first end of the pigtail optical fiber so that the light entering from the transmission optical fiber to the cladding portion of the pigtail optical fiber is not totally reflected on a boundary face between the cladding portion and an outside of the pigtail optical fiber, and the diameter of the cladding portion is gradually thinned in a longitudinal direction.

In still another embodiment of the invention, the mean attenuates or eliminates the light propagating through the cladding portion of the pigtail optical fiber in a middle of the pigtail optical fiber.

In still another embodiment of the invention, a material having a sufficiently high refractive index as compared with that of the cladding portion of the pigtail optical fiber is provided in the middle of the pigtail optical fiber so as to surround an entire periphery of the cladding portion and have a sufficient length so as to attenuate or eliminate the light propagating through the cladding portion of the pigtail optical fiber.

In still another embodiment of the invention, the pigtail optical fiber has a coating which substantially covers the entire side face of the cladding portion and has a higher refractive index than that of the cladding portion, and a total length of the pigtail optical fiber is sufficiently long so that the light propagating through the cladding portion is substantially attenuated and eliminated.

In still another embodiment of the invention, part of the cladding portion is removed throughout a periphery of the core portion in the pigtail optical fiber.

In still another embodiment of the invention, a fusion-type optical part or a waveguide-type optical part is inserted into the middle of the pigtail optical fiber and is connected to the core portion by fusion connection.

In still another embodiment of the invention, the core portion of the pigtail optical fiber is made of pure silica, the cladding portion is made of silica doped with a material lowering a refractive index such as fluorine and a material absorbing an optical signal due to irradiation of ionizing radiation, and a sufficient amount of the ionizing radiation is incident on part of or the whole pigtail optical fiber.

In still another embodiment of the invention, the cladding portion of the pigtail optical fiber is doped with a material attenuating the optical signal by absorption or scattering.

In still another embodiment of the invention, the light propagating through the cladding portion of the pigtail optical fiber is prevented from reaching or being focused on the light-receiving face of the light-receiving device between the pigtail optical fiber and the light-receiving device.

In still another embodiment of the invention, the cladding portion alone is coated with the light-shielding material at an end face of the second end.

In still another embodiment of the invention, a taper is provided for the cladding portion so that the cladding portion of the pigtail optical fiber has substantially no thickness at an end face of the second end.

In still another embodiment of the invention, a cladding propagation mode light shielding portion is provided between the pigtail optical fiber and the light-receiving device so as to prevent the light from the cladding portion of the pigtail optical fiber from entering the light-receiving device.

In still another embodiment of the invention, a core propagating mode light from the core portion of the pigtail optical fiber alone is focused on the light-receiving face of the light-receiving device by a light coupling system.

In still another embodiment of the invention, a portion of the light-receiving portion of the light-receiving device, on which the cladding propagation mode light from the cladding portion of the pigtail optical fiber is incident, is coated with the light shielding material so that the light-receiving device receives the core propagating mode light from the core portion of the pigtail optical fiber.

A light-receiving module of the invention prevents an optical signal propagated through a core portion of a transmission optical fiber from becoming a cladding propagation mode light in a pigtail optical fiber. Even if the cladding propagation mode light is generated by the connection with the optical connector or the clad propagating mode in a transmission light fiber becomes the light clad propagating mode of the pigtail optical fiber, the cladding propagation mode light does not reach a light-receiving face of a light-receiving device because of functions for attenuating, eliminating and releasing the cladding propagation mode light to the outside provided in the middle of the pigtail optical fiber or between the pigtail optical fiber and the light-receiving device.

As a result, the cladding propagation mode light does not interfere with the core propagating mode light on the light-receiving face of the light-receiving device. Thus, a light-receiving module, in which the deterioration of the transmitting characteristics such as interference of noise and distortion due to the above interference does not caused in an electronic transmitting signal frequency region, can be obtained.

Thus, the invention described herein makes possible an advantage of providing a light-receiving module capable of preventing deterioration of transmission characteristic due to interference of cladding propagation mode light with core propagation mode light on a light-receiving device and having stable transmission characteristic.

This and other advantages of the present invention will become apparent to those skilled in the art upon reading and understanding the following detailed description with reference to the accompanying figures.

BRIEF DESCRIPTION OF THE DRAWINGS

FIG. 7 schematically illustrates a principal portion of a light-receiving module of a fifth example according to the present invention.

FIG. 8A schematically illustrates a light-receiving module of a sixth example according to the present invention.

FIG. 8B schematically illustrates a principal portion of a light-receiving module of a sixth example according to the present invention.

FIG. 9A schematically illustrates a light-receiving module of a seventh example according to the present invention.

FIG. 9B schematically illustrates a principal portion of a light-receiving module of a seventh example according to the present invention.

FIG. 11 schematically illustrates a light-receiving module of a ninth example according to the present invention.

FIG. 15A schematically illustrates a light-receiving module of a thirteenth example according to the present invention.

FIG. 15B schematically illustrates a principal portion of a light-receiving module of a thirteenth example according to the present invention.

DESCRIPTION OF THE PREFERRED EMBODIMENTS

Hereinafter, the present invention will be described by way of illustrative examples, with reference to the accompanying drawings.

First, the present invention will be generally described.

Figure 1:
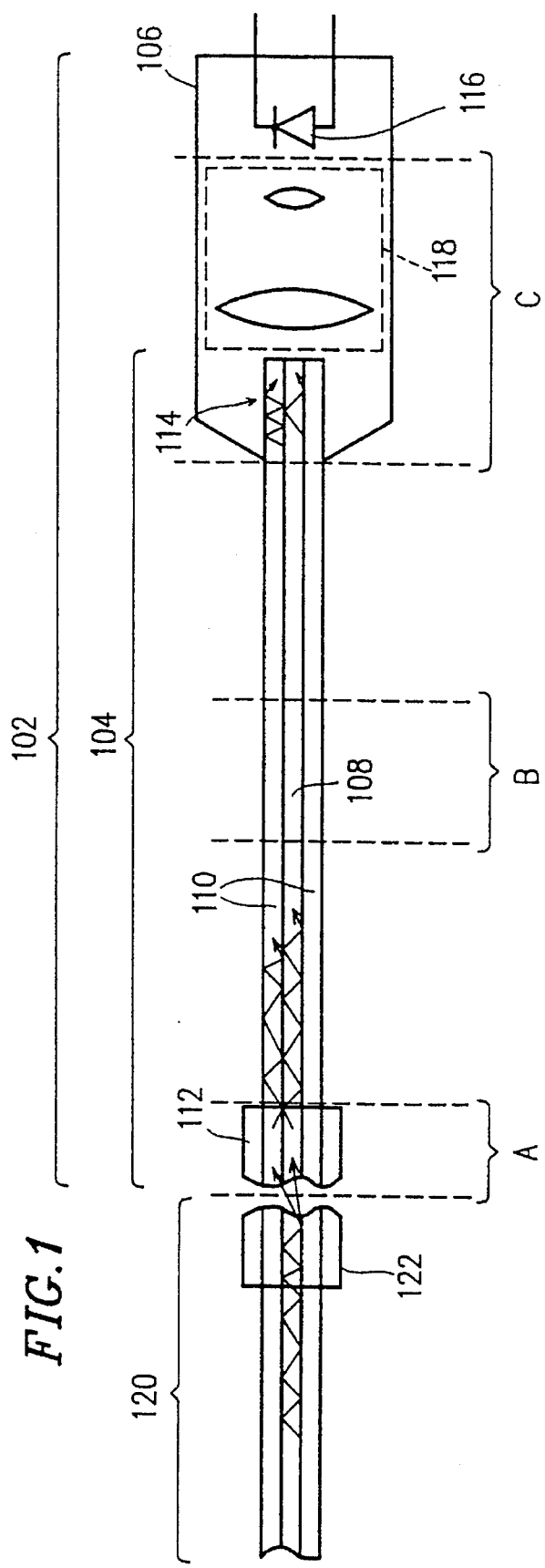
FIG. 1 is a diagram generally illustrating a light-receiving module according to the present invention.

FIG. 1 generally illustrates a light-receiving module 102 of the present invention. The light-receiving module 102 acts as a photoelectric converting device, and is used in a light-receiving apparatus of a light transmission system such as an optical communication. The light-receiving module 102 includes a pigtail optical fiber 104 and a light-receiving portion 106 optically connected to the pigtail optical fiber 104.

The pigtail optical fiber 104 includes a core portion 108 for transmitting an optical signal and a cladding portion provided so as to surround the core portion 108. At the tips of the core portion 108 and a cladding portion 110, an optical connector 112 is provided.

The light-receiving portion 106 includes a light-receiving device 116 for receiving an optical signal emitted from an end portion 114 of the pigtail optical fiber 104 and then converting the optical signal into an electric signal, and an optical coupling system 118 for converging the optical signal traveling through the pigtail optical fiber 104 onto the light-receiving device 116. The optical connector 112 is connected to an optical connector 122 of a transmission optical fiber 120, thereby optically connecting the pigtail optical fiber 104 and the transmission optical fiber 120 with each other. The optical signal transmitted through the transmission optical fiber 120 finally reaches the light-receiving device 116.

The light-receiving module 102 further has at least one of the following elements: an element provided at the portion marked A for preventing the optical signal from entering the cladding portion 110 provided for the pigtail optical fiber 104 in the optical connector 112; and an element provided at the portion marked B for eliminating or attenuating the optical signal propagating through the cladding portion 110 provided for the middle portion of the pigtail optical fiber 104; and an element provided at the portion marked C for preventing the optical signal propagating through the cladding portion 110 provided for the light-receiving portion 106 from entering the light-receiving device 116. These elements prevent the optical signal propagating through the cladding portion 110 from finally entering the light-receiving device 116. Although light-receiving modules having each element will be described in the following examples, the effects of the present invention will be further enhanced by providing a plurality of means for the light-receiving module.

The present invention is achieved based on such an understanding that the light-signal propagating through the cladding portion is the main cause of multipath causing the deterioration of transmission characteristics in conventional light transmitting systems. Such an optical signal propagating through the core portion that enters the cladding portion and propagates through the cladding portion is herein called a cladding propagation mode light. It is considered that the cladding propagation mode light is generated in the following portions.

a) Portions where the optical signal exits from the optical fiber and re-enters the optical fiber:

For example, the portion in which an optical part such as an optical attenuator, an optical filter, an optical coupler, and an optical wavelength division multiplexer is inserted or the portion where the transmission paths of the optical signal are not in appropriate physical contact with each other due to a recess (gap) of the optical fiber portion on the end face of the connector or positional difference between the curvature central axis and the core central axis of the end face in PC polishing of the optical connector.

b) Portions where the transmission optical fiber is bent and wound several times with a small curvature:

If such a portion is present in the light transmission path, the cladding propagation mode light re-enters the core portion and propagates through the cladding portion so as to reach an exit end of the pigtail optical fiber in the transmission path. As a result, the cladding propagation mode light is detected by the light-receiving device. Therefore, two paths for the core portion and the cladding portion, respectively, are present. Moreover, since it is recognized that there are a plurality of propagating modes in the cladding portion, the number of paths is increased with the increase in the number of modes.

A plurality of optical signals passing through the plurality of paths interfere with each other on the light-receiving face of the light-receiving device, thereby generating the beat in the frequency region of the electric signals. This causes the deterioration of the transmission characteristics due to the interference of noise and distortion. Changing in accordance with the amount of cladding propagation mode light and the polarization of core propagating mode light and cladding propagating mode light, the degree of beats changes due to minute differences and variations such as variations in the states of optical fiber, ambient temperature and optical signal wavelength. The interference of noise and distortion varies in accordance with the change in the degree of beat, and therefore is unstable in terms of time.

According to the present invention, even if the above portions and the cladding propagating mode light are present in the transmission optical fiber, the cladding propagation mode light does not enter the light-receiving device. Therefore, the noise and distortion on characteristics are remarkably eliminated.

Hereinafter, a light-receiving module of the present invention will be more specifically described. In the examples described below, components having the same functions are indicated by the same reference numerals so as to omit the need for a description. The same components as those of the light-receiving module 102 described referring to FIG. 1 are indicated by the same reference numerals.

EXAMPLE 1

Figure 2:
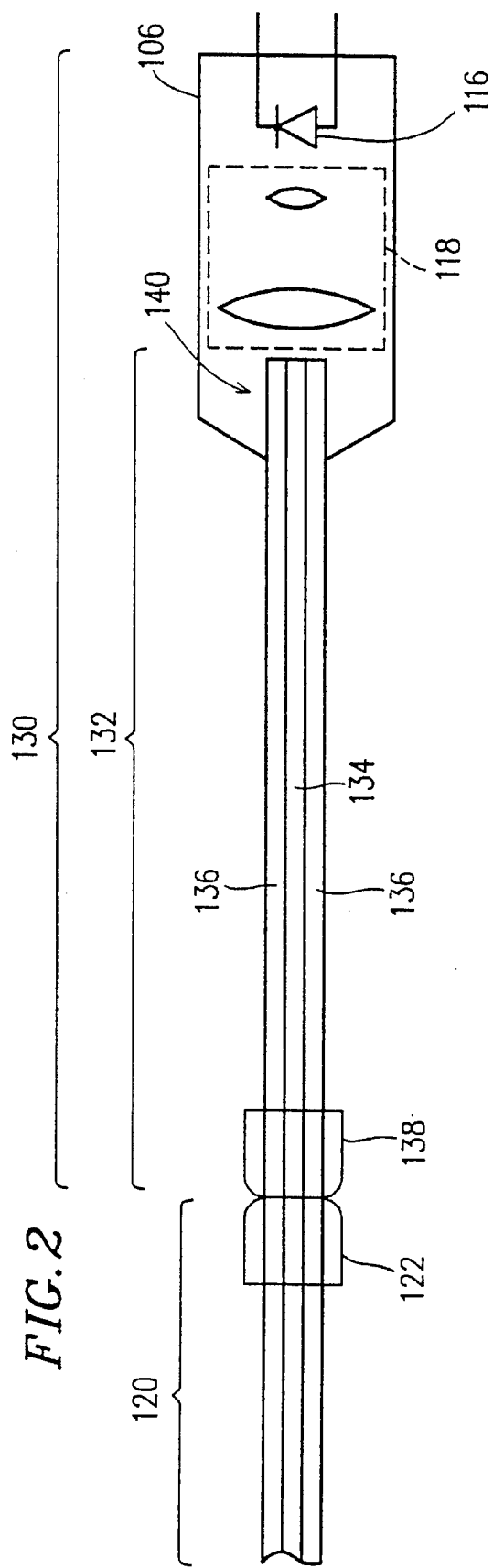
FIG. 2 schematically illustrates a light-receiving module of a first example according to the present invention.

FIG. 2 schematically illustrates a light-receiving module 130 of the present invention. The light-receiving module 130 includes a pigtail optical fiber 132 and the light-receiving portion 106 to which the pigtail optical fiber 130 is optically connected.

The pigtail optical fiber 132 includes a core portion 134 and a cladding portion 136 provided so as to surround the core portion 134. At the tips of the core portion 134 and the cladding portion 136, an optical connector 138 is provided.

The light-receiving portion 106 includes the light-receiving device 116 for receiving an optical signal emitted from an end portion 140 of the pigtail optical fiber 132 and then converting the optical signal into an electric signal and an optical coupling system 118 for converging the optical signal on the light-receiving device. The optical connector 138 is connected to an optical connector 122 of the transmission optical fiber 120, thereby optically connecting the pigtail optical fiber 132 to the transmission optical fiber 120. The optical signal transmitted through the transmission optical fiber 120 finally reaches the light-receiving device 116.

Figure 3:
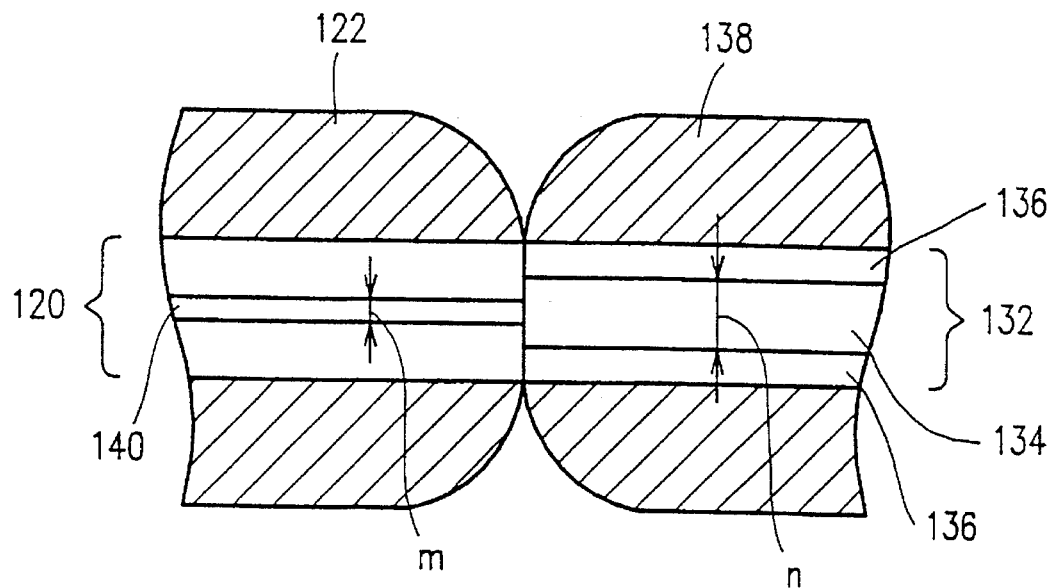
FIG. 3 schematically illustrates a principal portion of a light-receiving module of a first example according to the present invention.

The light-receiving module 130 has means for preventing the optical signal from entering the cladding portion 136 provided in the optical connector 138. FIG. 3 shows an enlarged connecting portion of the optical connectors 122 and 138. As shown in FIG. 3, the core portion 134 of the pigtail optical fiber 132 has a larger diameter than that of the core portion 140 of the transmission optical fiber 120.

The diameter n of the core portion 134 of the pigtail optical fiber 132 is set at a larger value than the diameter m of the core portion 140 of the transmission optical fiber 120, whereby the optical signal propagating through the core portion 140 of the transmission optical fiber 120 is likely to enter the core portion 134 of the transmission optical fiber 132 and therefore does not substantially enter the cladding portion 136. Since the optical signal does not substantially enter the cladding portion 136, the cladding propagating mode light is not generated. Therefore, since the optical signal propagating through the core on the light-receiving device does not interfere with the cladding propagating mode light, the cause of the deterioration of transmission characteristics does not occur.

The value of the diameter n of the core portion 134 is not limited to a specific value as long as it is larger than that of the diameter m of the core portion 140. However, it is preferable that the diameter n is larger the diameter m by more than 2 µm so that the optical signal is less likely to enter the cladding portion 136. The optical fiber normally used in the optical communication can be used in the present invention as long as it includes the core portion having a large diameter. For example, a single-mode fiber or a graded-index type multimode optical fiber can be used. The diameter of the core portion of the typical single-mode fiber normally used in the optical communication is about 10 µm. On the other hand, the diameter of the core portion of the graded-index type multimode optical fiber is about 50 µm. Therefore, if the typical single-mode fiber is used as the transmission optical fiber 120 and the typical graded-index type multimode optical fiber is used as the pigtail optical fiber 132 of the light-receiving module 130, it is possible to set the diameter n larger than the diameter m by more than 2 µm. Thus, the optical signal does not substantially enter the clad portion 136. As a result, the cladding propagation mode light is not substantially generated. However, since the graded-index type multimode optical fiber is used as the pigtail optical fiber 132, a plurality of propagation modes occur in the core portion 134. Since each propagation mode has a different group velocity in the core portion 134, what is called mode dispersion occurs. Such a mode dispersion becomes a kind of multipath and causes the deterioration of transmitting characteristics. The effect of the mode dispersion becomes greater as the arrival time difference of propagation modes becomes longer, that is, as the distance through which the optical signal propagates becomes longer. In the case where the graded-index type multimode optical fiber is used as the pigtail optical fiber 132, the total length of the graded-index type multimode optical fiber is required to be sufficiently short so that the mode dispersion does not affect the transmission characteristics. More specifically, the effect of the mode dispersion can be negligibly small as long as the length is several meters or less.

EXAMPLE 2

Figure 4:
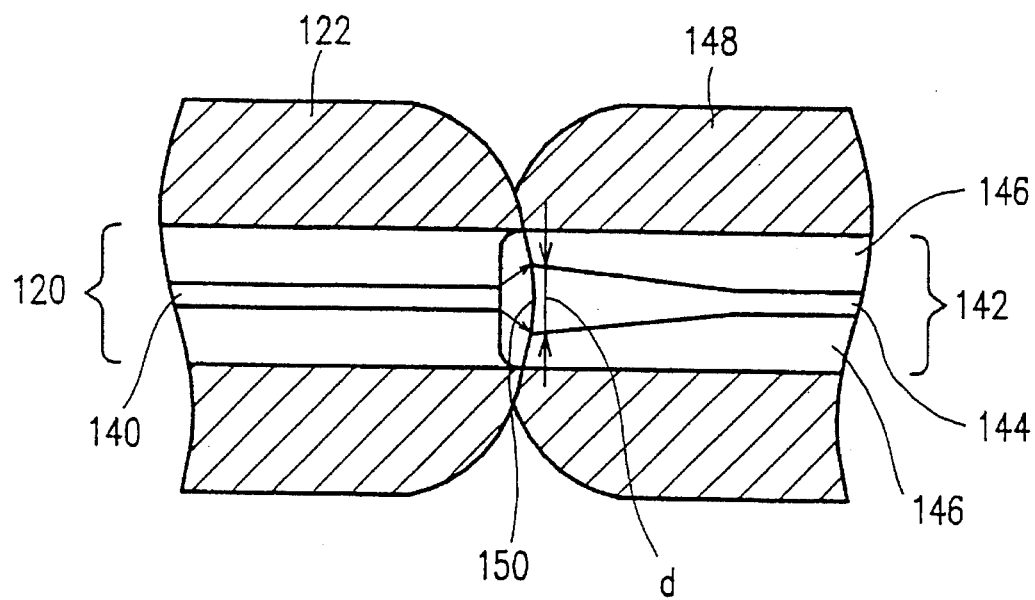
FIG. 4 schematically illustrates a principal portion of a light-receiving module of a second example according to the present invention.

FIG. 4 is a cross-sectional view of part of a pigtail optical fiber 142 of the light-receiving module according to a second example of the present invention. The pigtail optical fiber 142 includes a core portion 144 and a cladding portion 146 provided so as to surround the core portion 144. At the tips of the core portion 144 and the cladding portion 146, an optical connector 148 is provided. The core portion 144 has a conical shape so that its diameter decreases as it becomes distant from an end face 150 of the pigtail optical fiber 142 in a longitudinal direction. A diameter d of the core portion 144 is sufficiently large on the end face 150 so as to receive all the optical signals from the core portion 140 of the transmission optical fiber 120. Therefore, as in the first example, all the optical signals propagating through the core portion 140 of the transmission optical fiber 120 enter the core portion 144 of the pigtail optical fiber 142. As a result, the cladding propagation mode light is prevented from being generated.

EXAMPLE 3

Figure 5:
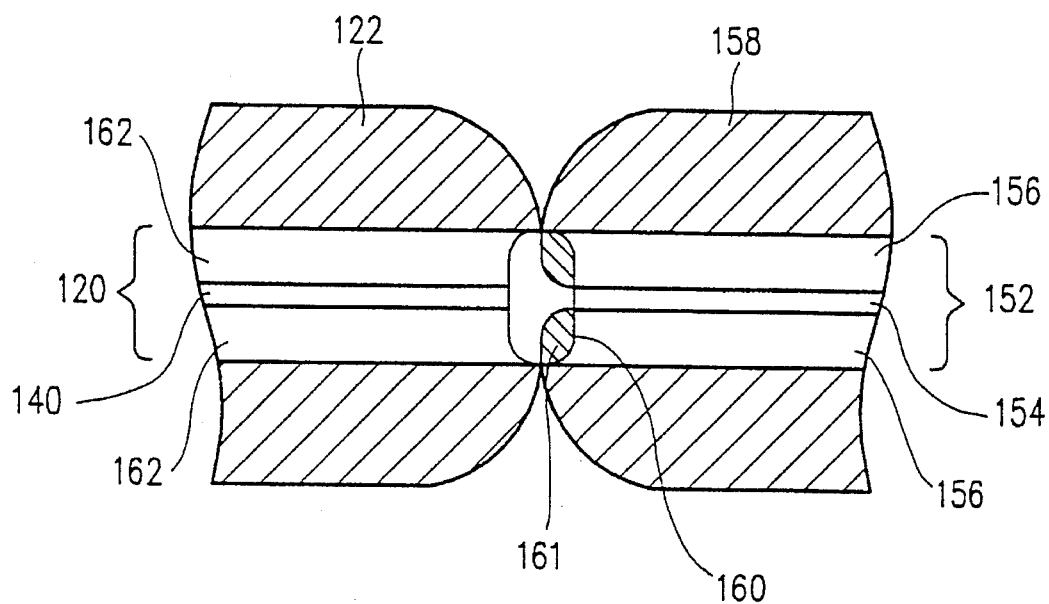
FIG. 5 schematically illustrates a principal portion of a light-receiving module of a third example according to the present invention.

FIG. 5 is a cross-sectional view of part of a pigtail optical fiber 152 of the light-receiving module according to a third example of the present invention. The pigtail optical fiber 152 includes a core portion 154 and a cladding portion 156 provided so as to surround the core portion 154. At the tips of the core portion 154 and the cladding portion 156, an optical connector 158 is provided. A tip 160 of the cladding portion 156 is coated with a light shielding film 161 in the optical connector 158. The light shielding film 161 is made of material which blocks the optical signal. For example, a metal film such as an aluminum film can be used.

The light shielding film 161 is capable of preventing the optical signal from entering the cladding portion 156 of the pigtail optical fiber 152. Therefore, the light shielding film 161 prevents the optical signal being propagated through the core portion 140 of the transmission path fiber 120 from entering the cladding portion 156 as well as preventing the cladding propagation mode light propagating through the cladding portion 162 of the transmission path fiber 120 from entering the cladding portion 156. Therefore, it is possible to perfectly eliminate the noise and distortion generated by the multipath.

EXAMPLE 4

Figure 6:
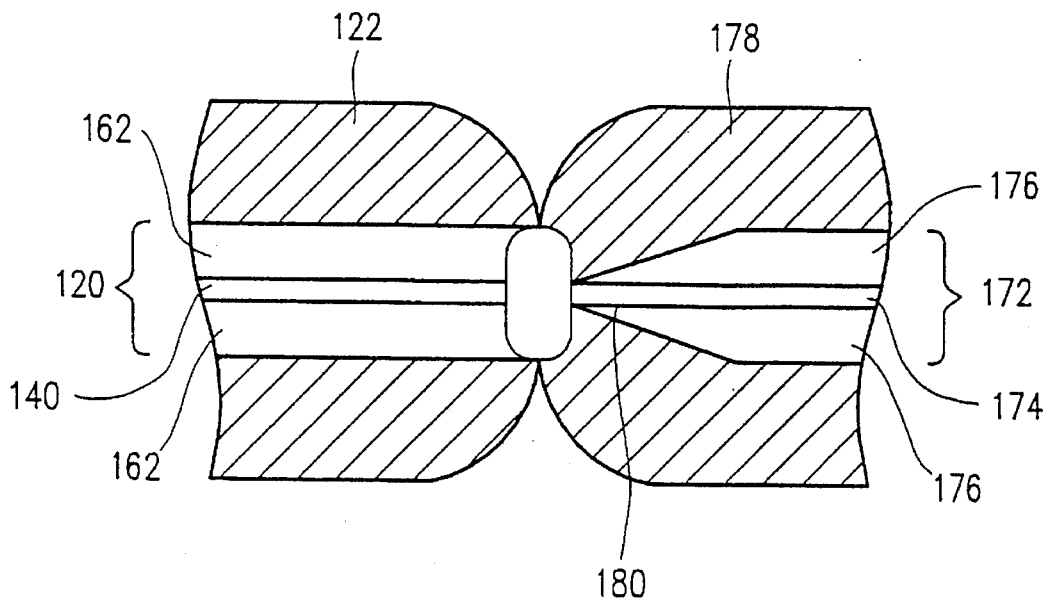
FIG. 6 schematically illustrates a principal portion of a light-receiving module of a fourth example according to the present invention.

FIG. 6 is a cross-sectional view of part of a pigtail optical fiber 172 of the light-receiving module according to a fourth example of the present invention. The pigtail optical fiber 172 includes a core portion 174 and a cladding portion 176 provided so as to surround the core portion 174. At the tips of the core portion 174 and the cladding portion 176, an optical connector 178 is provided. The cladding portion 176 has a taper having a decreasing thickness as it becomes close to a tip 180. Since the tip 180 of the cladding portion 176 has substantially no thickness, the light does not substantially enter the cladding portion 176 from the tip 180. Therefore, the light signal propagating through the core portion 140 of the transmission optical fiber 120 cannot enter the cladding portion 176. Moreover, the cladding propagation mode light propagating through the cladding portion 162 of the transmission optical fiber 120 cannot enter the cladding portion 176. The propagation of the light signal in the optical fiber having the tapered cladding portion is described in detail in U.S. Pat. No. 5,044,723.

EXAMPLE 5

FIG. 7 is a cross-sectional view of part of a pigtail optical fiber 182 of the light-receiving module according to a fifth example of the present invention. The pigtail optical fiber 182 includes a core portion 184 and a cladding portion 186 provided so as to surround the core portion 184. At the tips of the core portion 184 and the cladding portion 186, an optical connector 188 is provided. The cladding portion 186 has a conical shape, in which the core portion 184 is regarded as a central axis and an end portion 190 is regarded as a bottom face, gradually thinned as it becomes distant from the end portion 190 in the longitudinal direction in the optical connector 188. In the cladding portion 186 having such a shape, light entering from the end portion 190 is not totally reflected on a side face 192, but propagates to the outside of the cladding portion 186.

Even if the optical signal propagating through the core portion 140 of the transmission optical fiber 120 enters the cladding portion 186, the optical signal is propagated to the outside of the cladding portion 186 due to the cladding portion 184 having a conical shape provided in the optical connector 188. The cladding propagation mode light entering the cladding portion 186 from the cladding portion 162 is also propagated to the outside of the cladding portion 186. Therefore, it is possible to prevent the cladding propagation mode light from being propagated to the light-receiving device.

EXAMPLE 6

FIGS. 8A and 8B schematically show a light-receiving module 202 of the present invention. The light-receiving module 202 includes a pigtail optical fiber 204 and the light-receiving portion 106 to which the pigtail optical fiber 204 is optically connected.

The pigtail optical fiber 204 includes a core portion 206 for transmitting the optical signal and a cladding portion 208 provided so as to surround the core portion 206. At the tips of the core portion 206 and the cladding portion 208, an optical connector 210 is provided.

The light-receiving portion 106 includes a light-receiving device 116 for receiving an optical signal emitted from an end portion 212 of the pigtail optical fiber 204 and then converting the optical signal to an electric signal and an optical coupling system 118 for converging the optical signal onto the light-receiving device 116. The optical connector 210 is connected to an optical connector 122 of the transmission optical fiber 120, thereby optically connecting the pigtail optical fiber 204 and the transmission optical fiber 120 with each other. The optical signal transmitted through the transmission optical fiber 120 finally reaches the light-receiving device 116.

The light-receiving module 202 further includes a light eliminating portion 214 provided in the middle of the pigtail optical fiber 204 so as to surround the entire periphery of part of the cladding portion 208. The light eliminating portion 214 is made of material having sufficiently high refractive index as compared with the refractive index of the cladding portion 208 (n≈1.46), for example, diiodidemethane (refractive index n=1.74), α-bromonaphtalene (n=1.66), cedar oil (n=1.52) and benzene (n=1.50). The light eliminating portion 214 is optically connected to the cladding portion 208. Materials having a high refractive index are not limited to liquid, and therefore solids can also be used.

The light eliminating portion 214 releases the cladding propagation mode light propagating through the cladding portion 208 to the outside of the pigtail optical fiber 204, thereby preventing the cladding propagation mode light from propagating to the end portion 212 of the pigtail optical fiber 204.

The cladding propagation mode light generated by connecting the transmission optical fiber 120 with the light-receiving module 202 is propagated in the cladding portion 208 while being totally reflected by the boundary face between the cladding portion 208 of the pigtail optical fiber 204 and the outside. However, since the cladding propagation mode light is not totally reflected on the boundary face between the cladding portion 208 and the light eliminating portion 214 because of the difference in the refractive indices of the cladding portion 208 and the light eliminating portion 214, the cladding propagation mode light permeates from the cladding portion 208 to the light eliminating portion 214.

There is no cladding propagation mode light propagating through the cladding portion 208 after the light eliminating portion 214. Therefore, the optical signal propagating through the core portion 206 on the light-receiving device 116 does not interfere with the cladding propagating mode light.

If the difference in the refractive indices between the material having a high refractive index constituting the light eliminating portion 214 and the cladding portion 208 is sufficiently large, it is possible to sufficiently eliminate the cladding propagation mode light. Therefore, the length L1 of the light eliminating portion 214 can be short. In the case where the light eliminating portion 214 is made of the above material, it is preferable that the length L1 is typically in the range of several centimeters to several meters.

EXAMPLE 7

FIGS. 9A and 9B schematically show a light-receiving module 222 of a seventh example according to the present invention. The light-receiving module 222 is different from the light-receiving module 202 of Example 6 in that the light eliminating portion 214 is substituted by a coating 226 continuously covering the entire outside of the cladding portion 208. The coating 226 has a higher refractive index than that of the cladding portion 208 and is attached to the cladding portion 208. The coating 226 does not have a high refractive index as that of the high refractive index material constituting the light eliminating portion 214 of Example 6. Instead of this, a length L2 of the coating 226 is sufficiently long so that the cladding propagation mode light is substantially attenuated so as not to interfere with the optical signal propagating through the core portion 206.

The cladding propagation mode light propagating through the cladding portion 208 is not totally reflected by the boundary face between the cladding portion 208 and the coating 226 because of the difference in the refractive index. Therefore, the cladding propagation mode light is propagated to the coating 226 and absorbed thereby. Since the refractive index of the coating 226 is not sufficiently large, the percentage of the light which is not totally reflected and is propagated to the coating 226 is small. However, since the length L2 is sufficiently large, the cladding propagation mode light is gradually eliminated.

For the above reasons, in some cases the pigtail optical fiber 224 should have a larger length than the length necessary to connect the transmission optical fiber 120 with the light-receiving portion 106 in the light-receiving module 222. In such a case, it is preferred that the pigtail optical fiber 224 is bent with a curvature as large as possible, or the coating has a higher refractive index in order to make the length L2 as small as possible.

One of the properties of the light-receiving module 222 is in that an optical fiber currently on the market coated with coat having a higher refractive index than that of the cladding portion can be used as the pigtail optical fiber 224. For example, a signal is input from an end of an optical fiber currently on the market, and the noise and distortion due to the cladding propagation mode light are monitored at the other end. With this operation, a length sufficient to eliminate the cladding propagation mode light and therefore a length necessary for the pigtail optical fiber 224 can be obtained. In the case where an optical fiber on the market is used in Example 7, the length L2 is typically in the range of several meters to several tens of meters.

EXAMPLE 8

Figure 10:
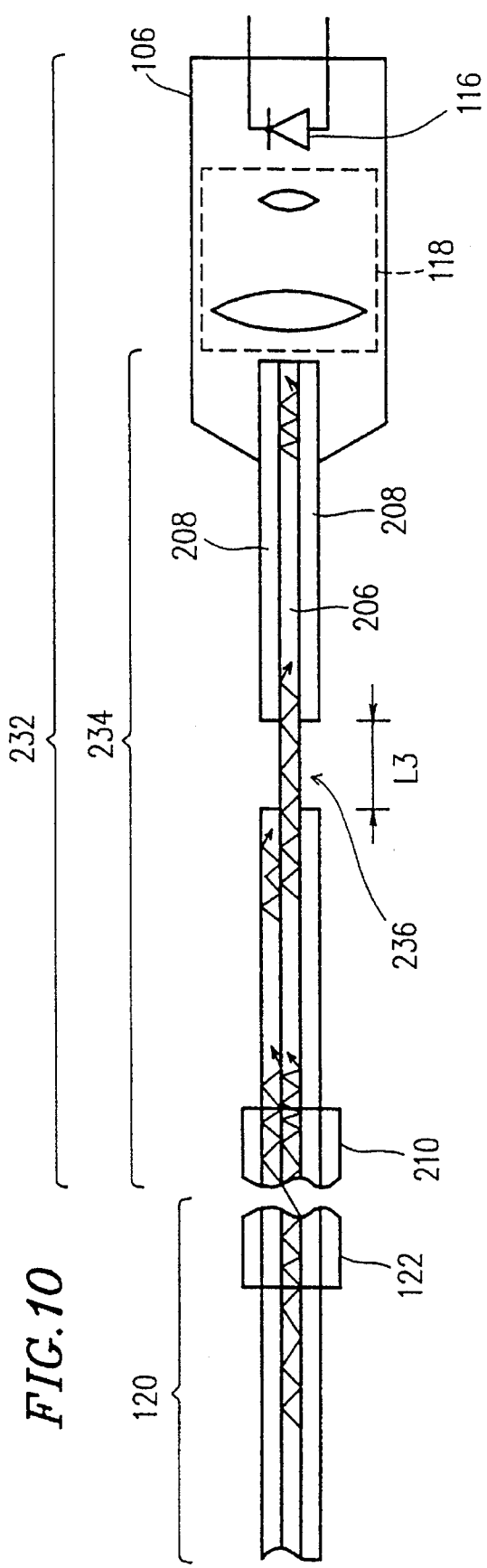
FIG. 10 schematically illustrates a light-receiving module of an eighth example according to the present invention.

FIG. 10 schematically shows a light-receiving module 232 of an eighth example of the present invention. The light-receiving module 232 is different from the light-receiving module 202 of Example 6 in that the light eliminating portion 214 is substituted by a light shielding portion 236 formed by removing part of the cladding portion 208 throughout the periphery of a part of the core portion 206.

Since the cladding propagation mode light propagating through the cladding portion 208 is blocked by the light shielding portion 236, the cladding propagation mode light is not propagated to the cladding portion 208 after the light shielding portion 236. Therefore, only the optical signal propagating through the core portion 206 is transmitted to the light-receiving device 116 and therefore the deterioration of transmission does not occur.

The length L3 of the light shielding portion 236 is sufficiently several mm long. The light-receiving module may have a means to physically hold or protect the portion in front of and behind the light shielding portion 236 in order to prevent the mechanical intensity of the pigtail optical fiber 234 from being lowered in the light eliminating portion 236.

EXAMPLE 9

FIG. 11 schematically shows a light-receiving module 242 of a ninth example of the invention. The light-receiving module 242 has a fusion-type optical part or a waveguide-type optical part 246 in the middle of a pigtail optical fiber 244. The fusion-type optical part or the waveguide-type optical part 246 is optically connected to the core portion 206 by a fusing connection without using an optical connector.

The fusion-type optical part is formed by twisting two or more optical fibers together and stretching them at a certain portion while fusing them. The fusion-type optical part is normally used as an optical coupler or a wavelength division multiplexer. The waveguide-type optical part is for propagating light by forming an optical waveguide on a substrate. The waveguide-type optical part is used not only as a passive part such as the optical coupler but also as an active part such as an external modulator. Although the optical signal propagating through the core portion propagates through both of the optical parts, the optical signal entering from the cladding portion cannot be transmitted to the exit portion of the optical part from the entrance portion.

Therefore, the cladding propagation mode light propagating through the cladding portion 208 is eliminated by attenuation, absorption and emission to the outside and the like with the fusion-type optical part or the waveguide-type optical part. Thus, the cladding propagation mode light is hindered from passing through the pigtail optical fiber, and only the optical signal propagating through the core is transmitted to the end portion of the pigtail optical fiber, thereby preventing the deterioration of transmission.

The reason why the optical part is inserted by fusion or the like without using the optical connector is because there is a possibility of generating the cladding propagation mode light in the case where the optical connector is used.

EXAMPLE 10

Figure 12A:
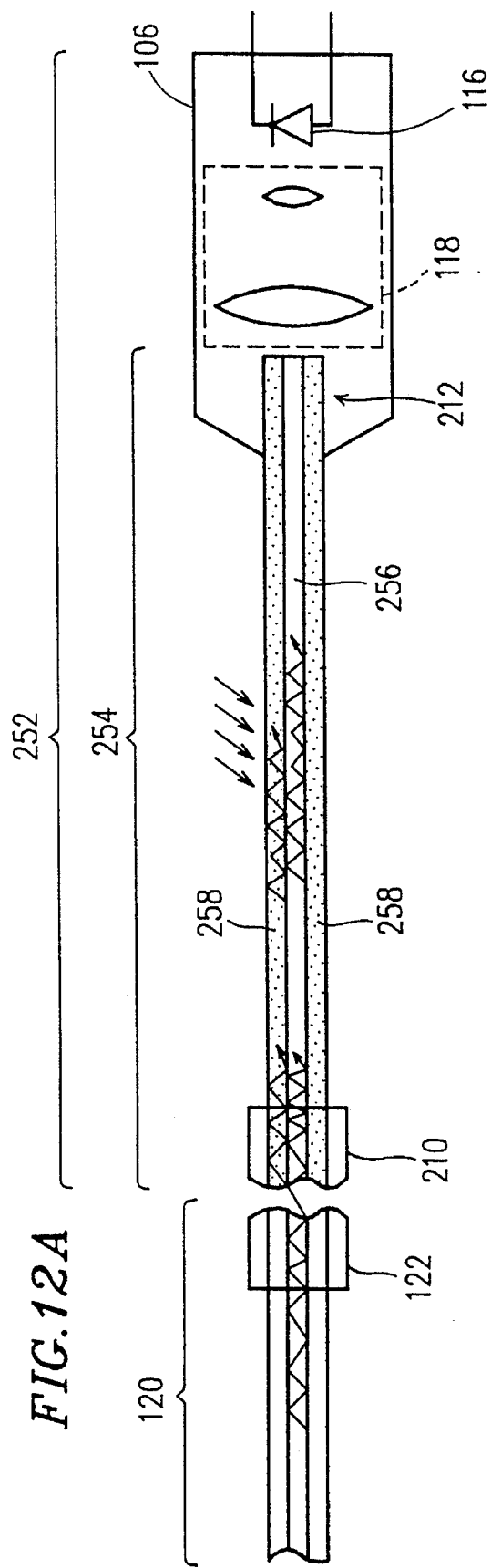
FIG. 12A schematically illustrates a light-receiving module of a tenth example according to the present invention.
Figure 12B:
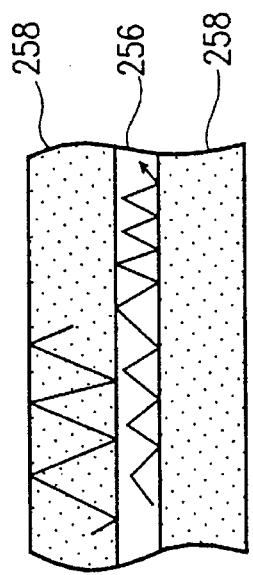
FIG. 12B schematically illustrates a principal portion of a light-receiving module of a tenth example according to the present invention.

FIGS. 12A and 12B schematically show a light-receiving module 252 of a tenth example of the present invention. The light-receiving module 252 includes a pigtail optical fiber 254 and the light-receiving portion 106 to which the pigtail optical fiber 254 is optically connected.

The pigtail optical fiber 254 includes a core portion 256 for transmitting the optical signal and a cladding portion 258 provided so as to surround the core portion 256. At the tips of the core portion 256 and the cladding portion 258, an optical connector 210 is provided.

The core portion 256 is made of pure silica, and the cladding portion 258 is made of silica doped with a material lowering the refractive index such as fluorine or silica doped with fluorine and a material causing light absorption in an optical signal wavelength band when an ionizing radiation is incident thereon. The ionizing radiation is incident on part of or the whole pigtail optical fiber 254.

In general, when the ionizing radiation is incident on the optical fiber, "color center" is generated since electrons are entrapped in the lattice defect. The color center absorbs near infrared ray from visible light based on the energy level. In the case where the optical fiber is made of pure silica, although light is absorbed by the above color center during the irradiation of ionizing radiation, the optical fiber rapidly returns to be in the former state after the irradiation, and light is no longer absorbed. However, in the case where the optical fiber is made of pure silica doped with fluorine, germanium or the like in order to enhance or lower the refractive index and the like, the amount of light absorption due to the irradiation of the ionizing radiation is larger than that of the optical fiber made of pure silica. Moreover, even after the irradiation, the optical fiber does not return to be in the state before the irradiation and still continues to absorb the light.

Therefore, since the core portion 256 does not include any doped material, the color center recovers and the light absorption scarcely occurs after the irradiation of ionizing radiation. Thus, the optical signal propagating through the core portion 256 is transmitted to the end portion 212 without any loss. On the other hand, the cladding portion 258, on which the ionizing radiation is incident, absorbs the cladding propagation mode light with the color center. Since the amount of light absorption of the cladding portion 258 is large, almost all of the cladding propagation mode light is absorbed in the course of the propagation and does not reach the end portion 212. As a result, only the light signal propagating through the core portion 256 is transmitted to the light-receiving device 116. Therefore, the deterioration of transmission does not occur.

EXAMPLE 11

Figure 13A:
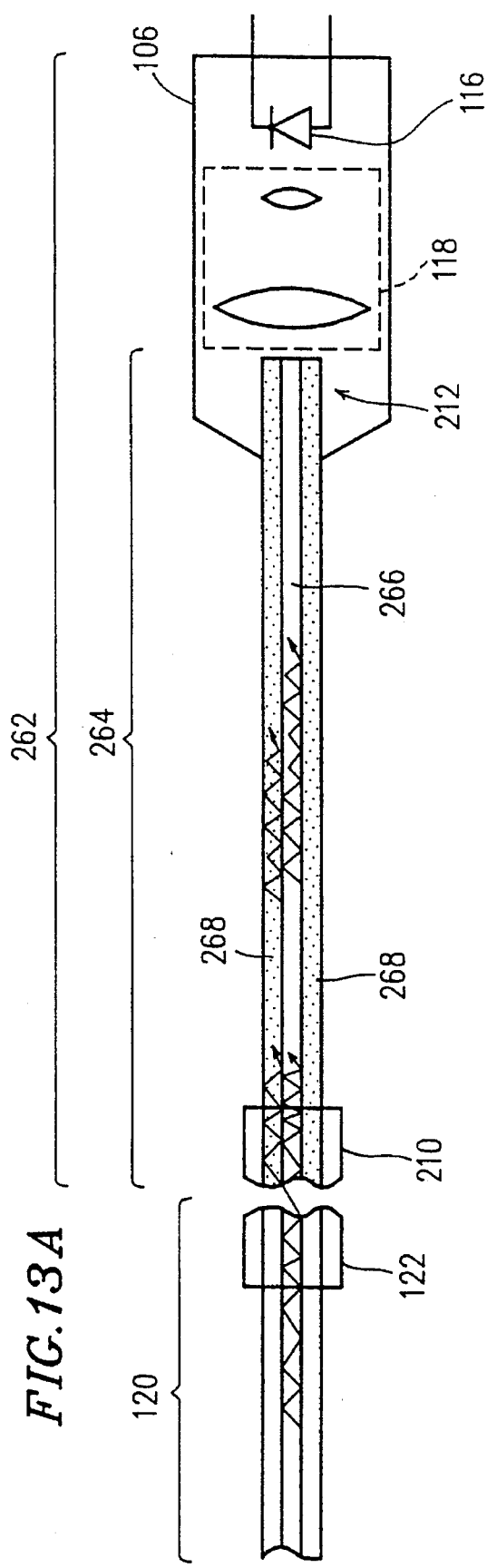
FIG. 13A schematically illustrates a light-receiving module of an eleventh example according to the present invention.
Figure 13B:
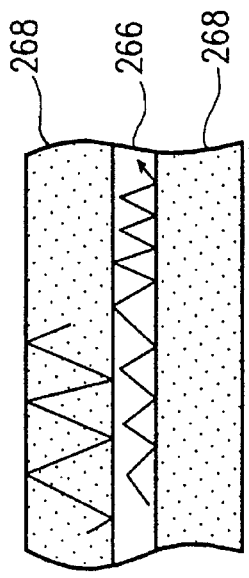
FIG. 13B schematically illustrates a principal portion of a light-receiving module of an eleventh example according to the present invention.

FIGS. 13A and 13B schematically illustrate a light-receiving module 262 of an eleventh example according to the present invention. The light-receiving module 262 includes a pigtail optical fiber 264 and the light-receiving portion 106 to which the pigtail optical fiber 264 is optically connected.

The pigtail optical fiber 264 includes a core portion 266 and a cladding portion 268 provided so as to surround the core portion 266. At the tips of the core portion 266 and the cladding portion 268, the optical connector 210 is provided.

The cladding portion 268 is made of silica doped with material attenuating the optical signal by absorption or diffusion in the signal light wavelength band such as a hydroxyl group or fine bubbles.

In the pigtail optical fiber 264, the optical signal propagating the core portion 266 is transmitted to the end portion 212 without any loss. However, almost of all the cladding propagation mode light is absorbed in the course of the transmission and does not reach the end portion 212 since the amount of light absorption of the cladding portion 268 is sufficiently large. As a result, only the optical light propagating through the core portion 266 is transmitted to the light-receiving device 166, whereby the deterioration of transmission is not caused.

EXAMPLE 12

Figures 14A, 14B:
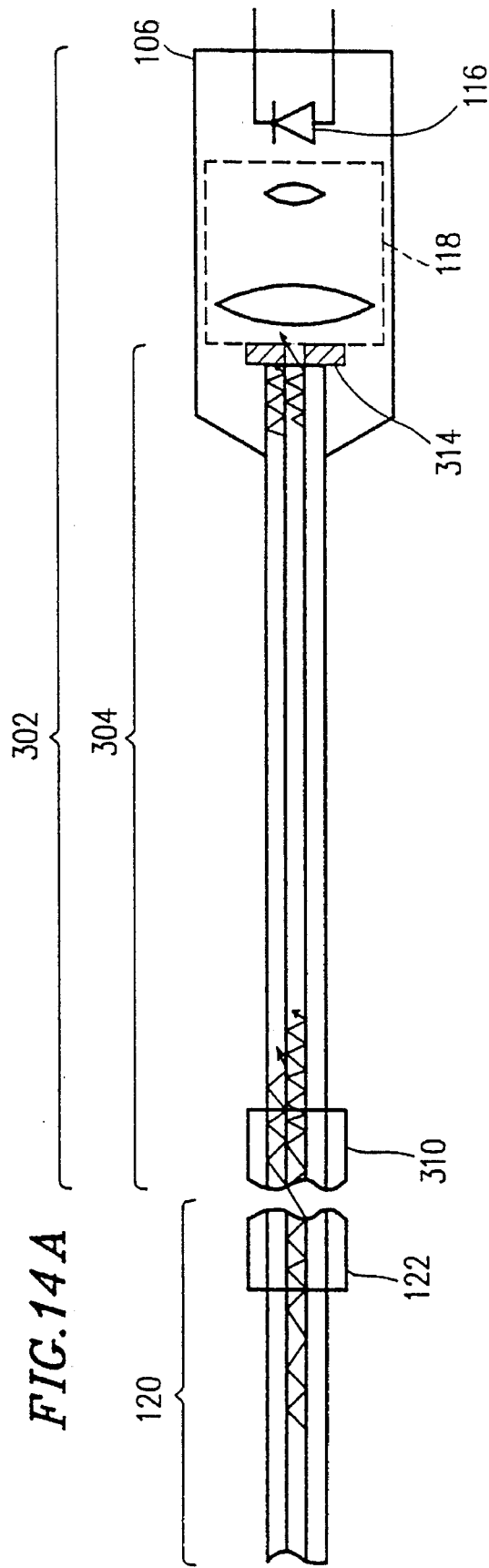
FIG. 14A schematically illustrates a light-receiving module of a twelfth example according to the present invention.
FIG. 14B schematically illustrates a principal portion of a light-receiving module of a twelfth example according to the present invention.

FIGS. 14A and 14B schematically illustrate a light-receiving module 302 of a twelfth example according to the present invention. The light-receiving module 302 includes a pigtail optical fiber 304 and the light-receiving portion 106 to which the pigtail optical fiber 304 is optically connected.

The pigtail optical fiber 304 includes a core portion 306 for transmitting the optical signal and a cladding portion 308 provided so as to surround the core portion 306. At the tips of the core portion 306 and the cladding portion 308, an optical connector 310 is provided.

An end portion 312 of the cladding portion 308 is covered with a light shielding film 314. The light shielding film 314 is made of material blocking the cladding propagation mode light. For example, a metal film made of aluminum and the like can be used.

The light shielding film 314 prevents the cladding propagation mode light propagating through the cladding portion 308 of the pigtail optical fiber 304 from exiting from the end portion 312 and entering the light-receiving device 116.

Therefore, the optical signal propagating through the core portion 306 does not interfere with the cladding propagation mode light in the light-receiving device 116, whereby the deterioration of transmission can be prevented.

EXAMPLE 13

FIGS. 15A and 15B schematically illustrate a light-receiving module 322 of a thirteenth example according to the present invention. The light-receiving module 322 includes a pigtail optical fiber 324 and the light-receiving portion 106 to which the pigtail optical fiber 324 is optically connected.

The pigtail optical fiber 324 includes the core portion 326 for transmitting an optical signal and a cladding portion 328 provided so as to surround the core portion 326. At the tips of the core portion 326 and the cladding portion 328, the optical connector 310 is provided.

The cladding portion 328 has a taper having a decreasing thickness as it becomes closer to an end face 332 of the pigtail optical fiber 324 in an end portion 330. Since the cladding portion 328 has substantially no thickness on the end face 332, the diameter of the pigtail optical fiber 324 is almost identical with that of the core portion 326 on the end face 332.

The cladding propagation mode light propagating through the cladding portion 328 exits from a side face 334 of the taper to the outside of the cladding portion 328 in the end portion 330 as required. The optical coupling system 118 is designed so as to efficiently couple the optical signal exiting from the core portion 326 alone to the light-receiving device 116. Therefore, the cladding propagation mode light emitted from the side face 334 of the taper is not substantially focused on the light-receiving face of the light-receiving device 116.

Thus, the optical signal propagating through the core portion 332 does not interfere with the cladding propagation mode light in the light-receiving device 116. As a result, the transmission can be prevented from being deteriorated.

EXAMPLE 14

Figure 16A:
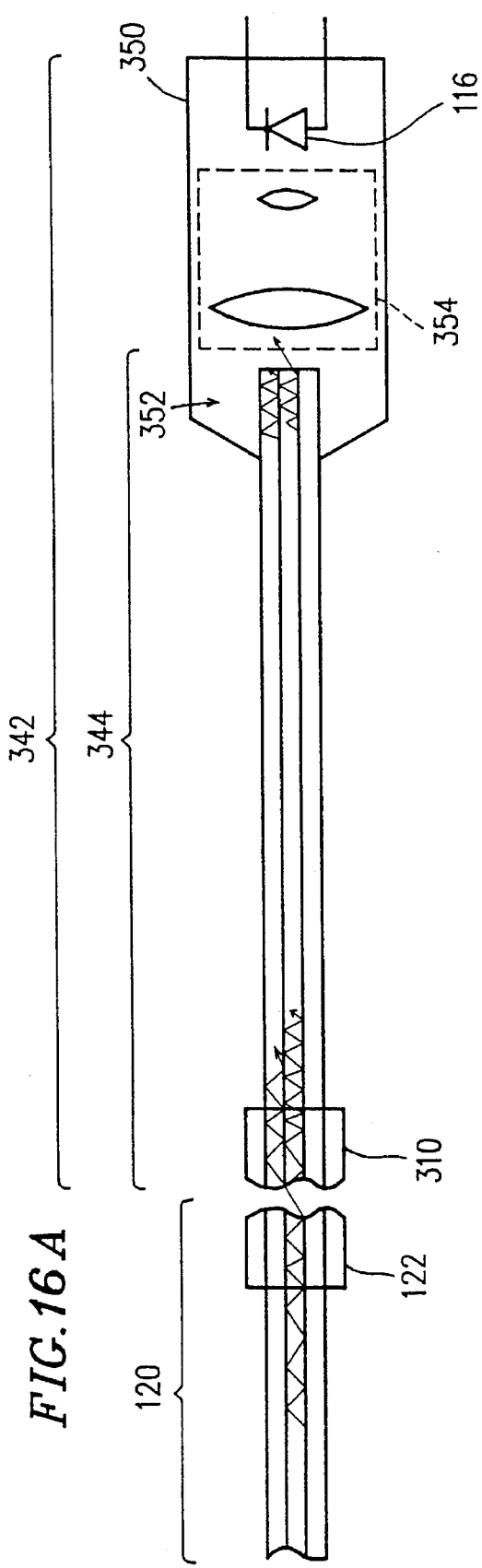
FIG. 16A schematically illustrates a light-receiving module of a fourteenth example according to the present invention.
Figure 16C:
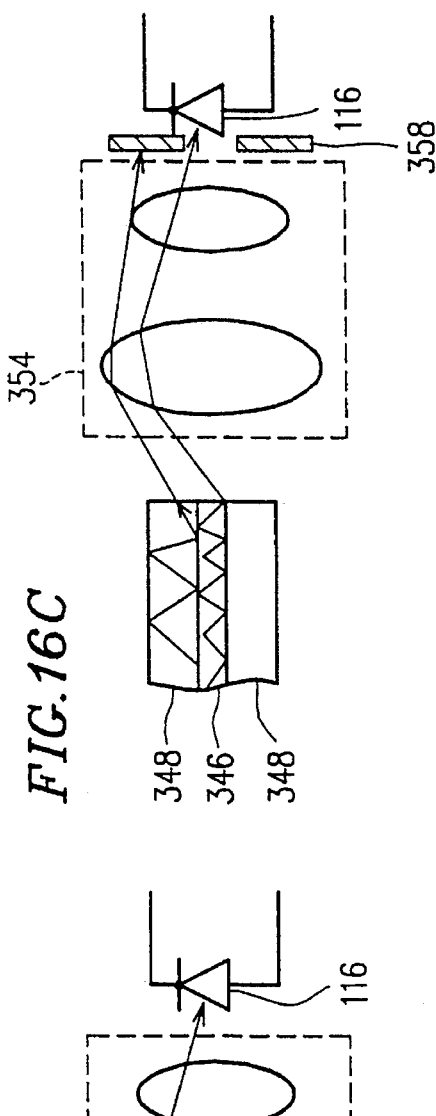
FIGS. 16B and 16C schematically illustrate a principal portion of a light-receiving module of a fourteenth example according to the present invention.
Figure 16B:
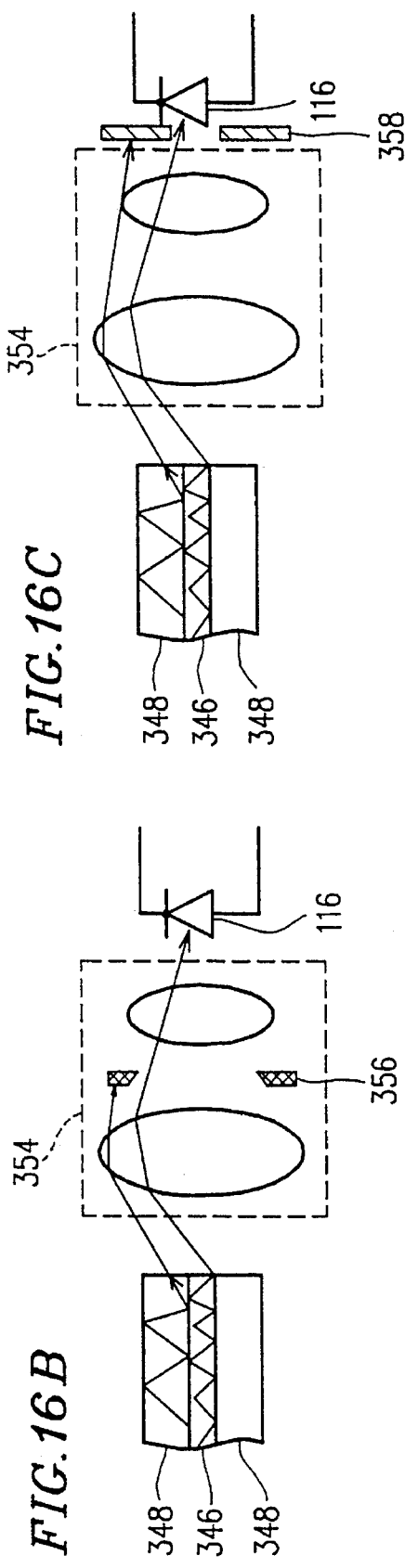

FIGS. 16A and 16B schematically illustrate a light-receiving module 342 of the present invention. The light-receiving module 342 includes a pigtail optical fiber 344 and a light-receiving portion 350 to which the pigtail optical fiber is optically connected.

The pigtail optical fiber 344 includes a core portion 346 for transmitting the optical signal and a cladding portion 348 provided so as to surround the core portion 346. On the tips of the core portion 346 and the cladding portion 348, an optical connector 310 is provided.

The light-receiving portion 350 includes the light-receiving device 116 for receiving an optical signal emitted from an end portion 352 of the pigtail optical fiber 344 and then converting the optical signal to an electric signal and an optical coupling system 354 for converging the optical signal on the light-receiving device.

The light-receiving portion 350 further includes a light shielding portion 356 having an aperture in the optical coupling system 354. The size of aperture of the light shielding portion 356 and the position of light shielding portion 356 are adjusted so that the light from the cladding portion 348 is blocked so as not to enter the light-receiving device 116 and the optical signal from the core portion 346 enters the light-receiving device 116.

Therefore, the cladding propagation mode light propagating through the cladding portion 348 is blocked by the light shielding portion 356 in the optical coupling system 354 and therefore does not reach the light-receiving device 116. On the other hand, the optical signal propagating through the core portion 346 passes through the aperture of the light shielding portion 356 and efficiently enters the light-receiving device 116 in the optical coupling system 354. Therefore, the optical signal does not interfere with the core propagating mode light in the light-receiving device, thereby preventing the deterioration of transmission.

In addition, as shown in FIG. 16C, a coating may be provided for the light-receiving face of the light-receiving device 116 instead of the light shielding portion 356 so as to block the light from the cladding portion 348 alone among the light converged by the optical coupling system 354.

In the case where the light shielding portion 356 and the coating 358 are not provided, a lens in the optical coupling system 354 may be adjusted so that only the optical signal exiting from the core portion 346 is converged on the light-receiving face of the light-receiving device 116 and the light exiting from the cladding portion 348 is not converged on the light-receiving face of the light-receiving device 116. In such a case, since the cladding portion 348 is formed so as to surround the outer periphery of the core portion 346, the optical coupling system 354 can be designated in view of the incident angle and the vignetting of the optical signal exiting from the end portion 352 of the pigtail optical fiber 344 and the cladding propagation mode light.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A light-receiving module comprising:

a pigtail optical fiber including a core portion for transmitting an optical signal and a cladding portion covering a side face of the core portion;

an optical connector provided at a first end of the pigtail optical fiber for optically connecting a transmitting optical fiber to the first end of the pigtail optical fiber;

a light-receiving device having a light-receiving face for receiving the optical signal propagating through the core portion and for converting the optical signal into an electric signal;

an optical coupling system for converging the optical signal emitted from a second end of the pigtail optical fiber onto the light-receiving face of the light-receiving device; and means for preventing transmission of light from the cladding portion to the light-receiving device so that the optical signal propagating through the core portion does not interfere with light propagating through the cladding portion on the light-receiving face of the light-receiving device.

2. A light-receiving module according to claim 1, wherein the means prevents light propagating through a core portion of the transmission optical fiber from entering the cladding portion of the pigtail optical fiber at the first end of the pigtail optical fiber.

3. A light-receiving module according to claim 2, wherein a diameter of the core portion of the pigtail optical fiber is greater than that of the core portion of the transmission optical fiber, and the pigtail optical fiber is a single-mode optical fiber.

4. A light-receiving module according to claim 2, wherein the diameter of the core portion of the pigtail optical fiber is greater than that of the core portion of the transmission optical fiber, and the pigtail optical fiber is a graded-index type multimode fiber which is sufficiently short so that an effect of mode dispersion is neglected.

5. A light-receiving module according to claim 2, wherein the diameter of the core portion of the pigtail optical fiber is sufficiently large at an end face of the first end optically connected to the transmission optical fiber so that all optical signals from the core portion of the transmission optical fiber enter the pigtail optical fiber, and is gradually reduced in a longitudinal direction.

6. A light-receiving module according to claim 1, wherein the means prevents the light propagating through the core portion of the transmission optical fiber from entering the cladding portion of the pigtail optical fiber and light propagating through the cladding portion of the transmission optical fiber from entering the cladding portion of the pigtail optical fiber.

7. A light-receiving module according to claim 6, wherein a light shielding material covers the cladding portion at an end face of the first end of the pigtail optical fiber.

8. A light-receiving module according to claim 6, wherein the cladding portion of the pigtail optical fiber has a tapered shape being thinned to a diameter of the core at an end face of the first end of the pigtail optical fiber so as to prevent the light from entering the cladding portion of the pigtail optical fiber from the transmission optical fiber.

9. A light-receiving module according to claim 6, wherein the diameter of the cladding portion is large at an end face of the first end of the pigtail optical fiber so that the light entering from the transmission optical fiber to the cladding portion of the pigtail optical fiber is not totally reflected on a boundary face between the cladding portion and an outside of the pigtail optical fiber, and the diameter of the cladding portion is gradually thinned in a longitudinal direction.

10. A light-receiving module according to claim 1, wherein the light propagating through the cladding portion of the pigtail optical fiber is prevented from reaching or being focused on the light-receiving face of the light-receiving device between the pigtail optical fiber and the light-receiving device.

11. A light-receiving module according to claim 10, wherein the cladding portion alone is coated with the light-shielding material at an end face of the second end.

12. A light-receiving module according to claim 10, wherein a taper is provided for the cladding portion so that the cladding portion of the pigtail optical fiber has substantially no thickness at an end face of the second end.

13. A light-receiving module according to claim 10, wherein a cladding propagation mode light shielding portion is provided between the pigtail optical fiber and the light-receiving device so as to prevent the light from the cladding portion of the pigtail optical fiber from entering the light-receiving device.

14. A light-receiving module according to claim 10, wherein a core propagating mode light from the core portion of the pigtail optical fiber alone is focused on the light-receiving face of the light-receiving device by a light coupling system.

15. A light-receiving module according to claim 10, wherein a portion of the light-receiving portion of the light-receiving device, on which the cladding propagation mode light from the cladding portion of the pigtail optical fiber is incident, is coated with the light shielding material so that the light-receiving device receives the core propagating mode light from the core portion of the pigtail optical fiber.

16. A light-receiving module according to claim 1, wherein the light-receiving module is used in a subcarrier multiplexing transmission system for optical communication.

17. A light-receiving module comprising:

a pigtail optical fiber including a core portion for transmitting an optical signal and a cladding portion covering a side face of the core portion;

an optical connector provided at a first end of the pigtail optical fiber for optically connecting a transmitting optical fiber to the first end of the pigtail optical fiber;

a light-receiving device having a light-receiving face for receiving the optical signal propagating through the core portion and for converting the optical signal into an electric signal;

an optical coupling system for converging the optical signal emitted from a second end of the pigtail optical fiber onto the light-receiving face of the light-receiving device; and means for preventing transmission of light from the cladding portion to the light-receiving device so that the optical signal propagating through the core portion does not interfere with light propagating through the cladding portion on the light-receiving face of the light-receiving device, wherein the means for preventing substantially attenuates or eliminates any light propagating through the cladding portion of the pigtail optical fiber in a middle of the pigtail optical fiber.

18. A light-receiving module according to claim 17, wherein a material having a sufficiently high refractive index as compared with that of the cladding portion of the pigtail optical fiber is provided in the middle of the pigtail optical fiber so as to surround an entire periphery of the cladding portion and have a sufficient length so as to attenuate or eliminate the light propagating through the cladding portion of the pigtail optical fiber.

19. A light-receiving module according to claim 17, wherein the pigtail optical fiber has a coating which substantially covers the entire side face of the cladding portion and has a higher refractive index than that of the cladding portion, and a total length of the pigtail optical fiber is sufficiently long so that the light propagating through the cladding portion is substantially attenuated and eliminated.

20. A light-receiving module according to claim 17, wherein part of the cladding portion is removed throughout a periphery of the core portion in the pigtail optical fiber.

21. A light-receiving module according to claim 17, wherein a fusion-type optical part or a waveguide-type optical part is inserted into the middle of the pigtail optical fiber and is connected to the core portion by fusion connection.

22. A light-receiving module according to claim 17, wherein the core portion of the pigtail optical fiber is made of pure silica, the cladding portion is made of silica doped with a material lowering a refractive index such as fluorine and a material absorbing an optical signal due to irradiation of ionizing radiation, and a sufficient amount of the ionizing radiation is incident on part of or the whole pigtail optical fiber.

23. A light-receiving module according to claim 17, wherein the cladding portion of the pigtail optical fiber is doped with a material attenuating the optical signal by absorption or scattering.

* * * * *